United States Patent [19]
Kobayashi et al.

[11] Patent Number: 5,878,654
[45] Date of Patent: Mar. 9, 1999

[54] COFFEE EXTRACTING APPARATUS HAVING A CONTROL VALVE FOR CONTROLLING A FEED OF PRESSED HOT WATER TO AN EXTRACTING CONTAINER

[75] Inventors: Makoto Kobayashi, Takasaki; Isao Katou, Ota; Karin Okamura; Akio Kawabata, both of Isesaki, all of Japan

[73] Assignee: Sanden Corporation, Japan

[21] Appl. No.: 872,171

[22] Filed: Jun. 10, 1997

[30] Foreign Application Priority Data

Jun. 11, 1996 [JP] Japan ................................ 8-148853

[51] Int. Cl.$^6$ .............................. A47J 31/40; A47J 31/32
[52] U.S. Cl. ..................... 99/299; 99/302 R; 99/302 P; 426/433
[58] Field of Search ........................... 99/283, 299, 300, 99/302 R, 302 P; 426/433

[56] References Cited

U.S. PATENT DOCUMENTS

| | | |
|---|---|---|
| 4,506,596 | 3/1985 | Shigenobu et al. ............. 99/302 P X |
| 5,083,504 | 1/1992 | Koga et al. ..................... 99/299 X |
| 5,103,716 | 4/1992 | Mikkelsen ...................... 99/302 P X |
| 5,302,407 | 4/1994 | Vetterli ........................... 99/302 P X |
| 5,392,694 | 2/1995 | Muller et al. ................... 99/302 P X |

FOREIGN PATENT DOCUMENTS

| | | |
|---|---|---|
| 0073739 | 3/1983 | European Pat. Off. . |
| 0250810 | 1/1988 | European Pat. Off. . |
| 0546498 | 6/1993 | European Pat. Off. . |

*Primary Examiner*—Reginald L. Alexander
*Attorney, Agent, or Firm*—Banner & Witcoff, Ltd.

[57] ABSTRACT

In a coffee extracting apparatus in which an extracting container (51) extracts coffee essence from coffee powder with being supplied with hot water of substantially normal pressure and elevated temperature, a water control valve (48) controls a feed of the hot water to the extracting container. The hot water is fed to the extracting container with being pressed in a water feeding device (43). The coffee essence is taken out from the extracting container together with the hot water through a filter member (53, 54) supported by a support member (52).

15 Claims, 4 Drawing Sheets

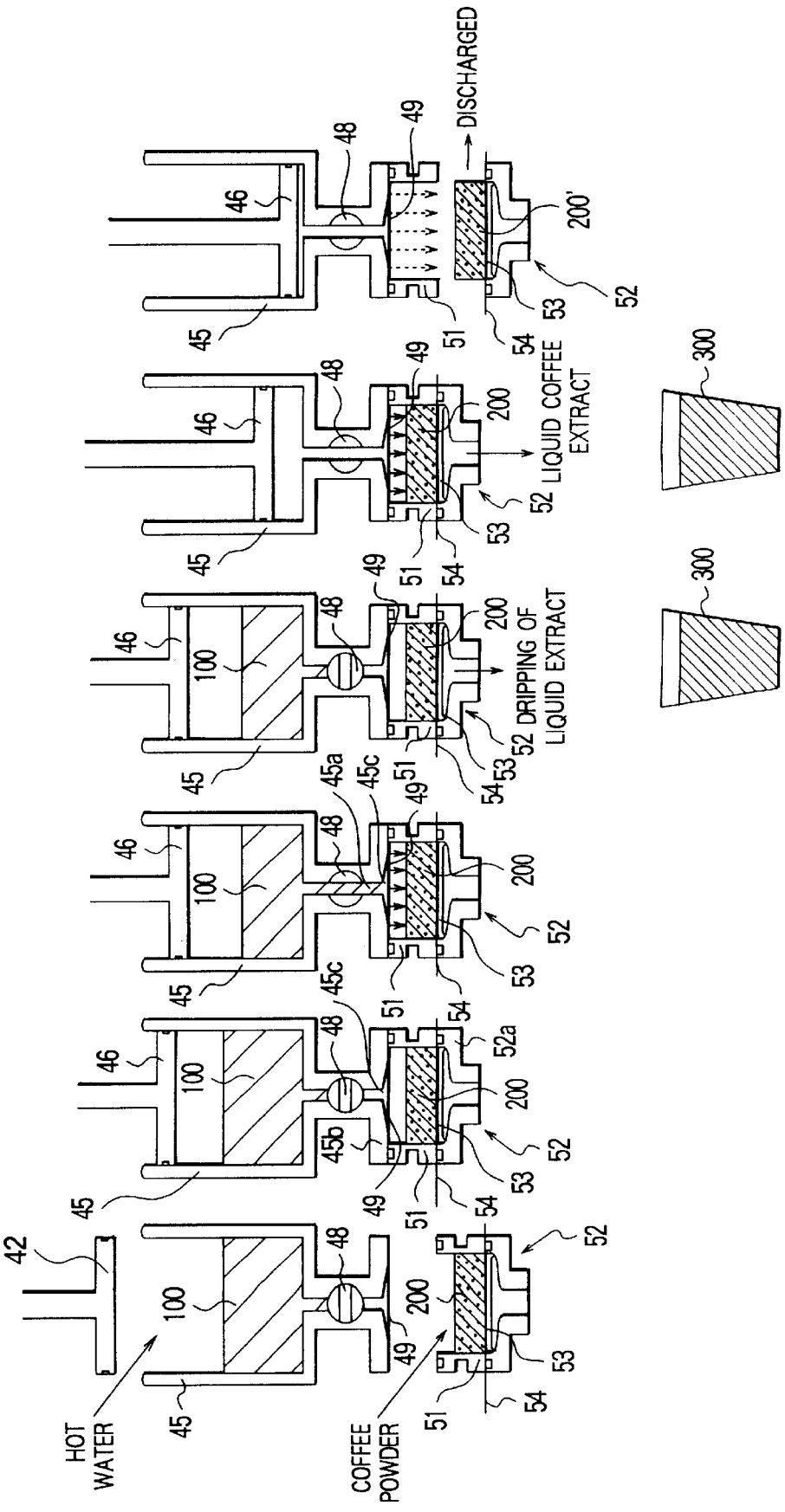

COFFEE EXTRACTING APPARATUS HAVING A CONTROL VALVE FOR CONTROLLING A FEED OF PRESSED HOT WATER TO AN EXTRACTING CONTAINER

BACKGROUND OF THE INVENTION

This invention relates to a coffee extracting apparatus of a percolating type for extracting coffee essence from coffee material or powder by supplying hot water to the coffee powder.

As a coffee extracting apparatus of the type, use is conventionally made of a hot water feeding cylinder type extracting apparatus and an espresso extracting apparatus.

A conventional hot water feeding cylinder type extracting apparatus comprises an extracting container having an outlet opening for extracting coffee essence from coffee powder with being supplied with hot water of substantially normal pressure and elevated temperature. A filter member is used to cover the outlet opening of the receiving container and supported by a supported member in the manner known in the art.

However, the conventional hot water feeding cylinder type extracting apparatus is at a disadvantage in being unable to obtain the liquid coffee extract of amply high concentration because the operation thereof is devoid of a step of prewetting and steaming. It is further at a disadvantage in being unable to attain accelerated extraction of coffee essence because the hot water in the hot water feeding cylinder is forced by the hot water feeding piston into the extracting cylinder and consequently the rise of the pressure in the extracting cylinder is slow.

A conventional espresso extracting apparatus has a structure which will later be described in conjunction with the figure. The conventional espresso extracting apparatus is at a disadvantage in requiring the reheating device for accommodating the hot water of elevated temperature and increased pressure to be in a strong structure proof against pressure, further requiring the water heating device for heating the cold water of increased pressure to be in a structure proof against pressure, also necessitating provision of a water pump, a check valve, etc., and consequently entailing an high cost of equipment.

SUMMARY OF THE INVENTION

It is therefore an object of this invention to provide coffee extracting apparatus of a percolating type which is capable of obtaining a liquid coffee extract of high concentration and permitting extraction of coffee essence at a high speed as compared with the conventional hot water feeding cylinder type extracting apparatus.

It is another object of this invention to provide a coffee extracting apparatus of the type described, which is inexpensive as compared with the conventional espresso extracting apparatus.

Other objects of this invention will become clear as the description proceeds.

According to this invention, there is provided a coffee extracting apparatus comprising an extracting container having an outlet opening for extracting coffee essence from coffee powder with being supplied with hot water of substantially normal pressure and elevated temperature and a support member for supporting a filter member to cover the outlet opening of the extracting container. The coffee extracting apparatus further comprises a water feeding device connected to the extracting container for feeding the hot water to the extracting container with pressing the hot water and a water control valve connected to the water feeding device for controlling a feed of the hot water from the water feeding device to the extracting container.

According to this invention, there is provided a method of carrying out an extracting process in the above-mentioned coffee extracting apparatus. The method comprises the step of device-driving the water control valve to intermittently adjust the feed of the hot water to the extracting container during the extracting process.

BRIEF DESCRIPTION OF THE DRAWINGS

FIGS. 4A through 4F are schematic diagrams for describing the operation of the coffee extracting apparatus illustrated in FIG. 3.

DESCRIPTION OF THE PREFERRED EMBODIMENTS

Figure 1:
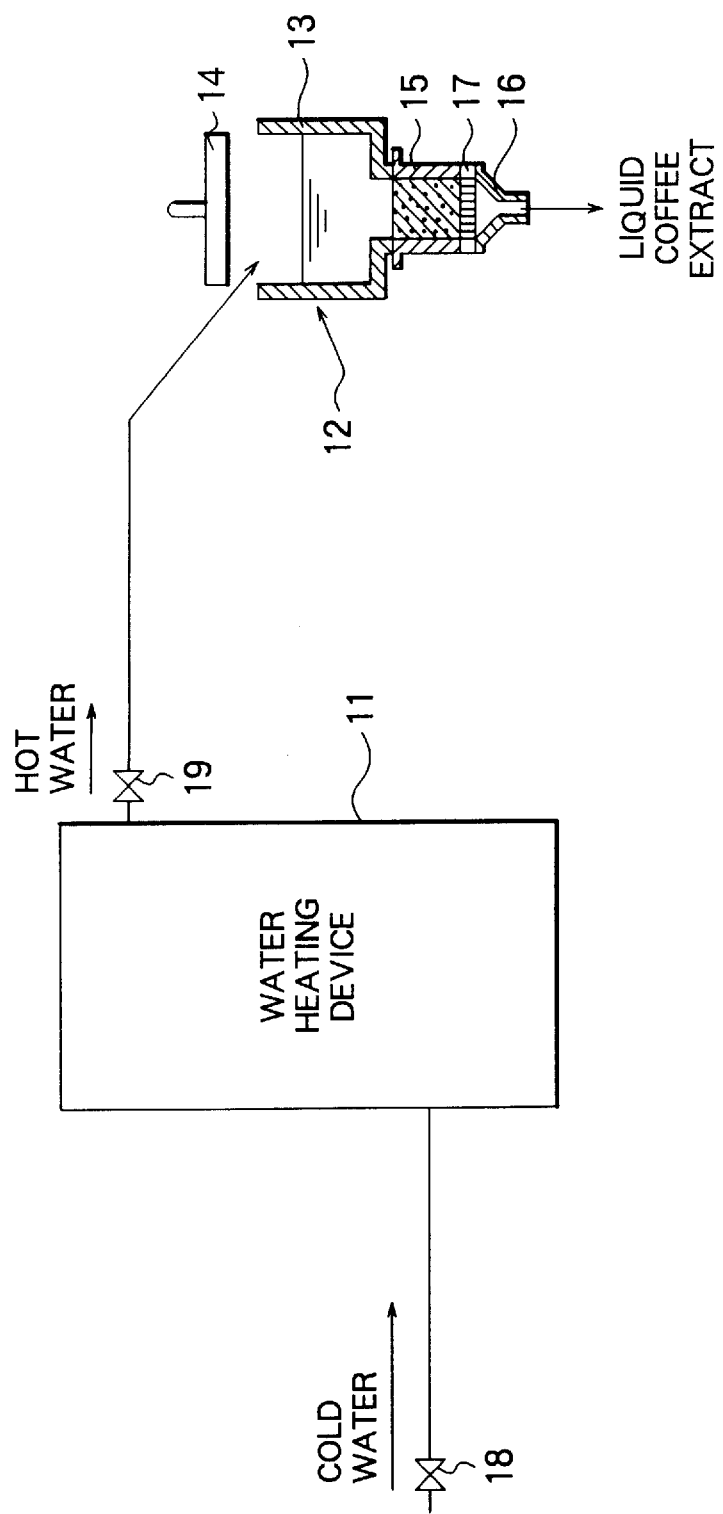
FIG. 1 is a schematic diagram of a conventional hot water feeding cylinder type extracting apparatus.

Referring to FIG. 1, description will be made as regards a conventional hot water feeding cylinder type extracting apparatus. The hot water feeding cylinder type extracting apparatus comprises a water heating device 11, a hot water feeding device 12 provided with a hot water cylinder 13 and a hot water piston 14 fitted into the hot water cylinder 13 and connected to the water heating device 11, an extracting cylinder 15 connected at one end thereof to the outlet of the hot water cylinder 13, and a filter support 16 for supporting a plate-like filter 17 so as to cover the other end of the extracting cylinder 15.

In the hot water feeding cylinder type extracting apparatus, cold water flows into the water heating device 11 via a valve 18. The cold water is heated by the water heating device 11 and turned into hot water of substantially normal pressure and elevated temperature. The hot water flows into the hot water cylinder 13 via a valve 19. By the operation of the hot water piston 14, the hot water of elevated temperature held in the hot water cylinder 13 is forced out via the outlet thereof. The hot water of substantially normal pressure and elevated temperature which has been forced out of the hot water cylinder 13 passes a layer of coffee powder in the extracting cylinder 15 and allows extraction of the coffee essence contained in the coffee powder. The liquid coffee extract is removed from the extracting cylinder 15 via the plate-like filter 17 and the filter support 16.

Figure 2:
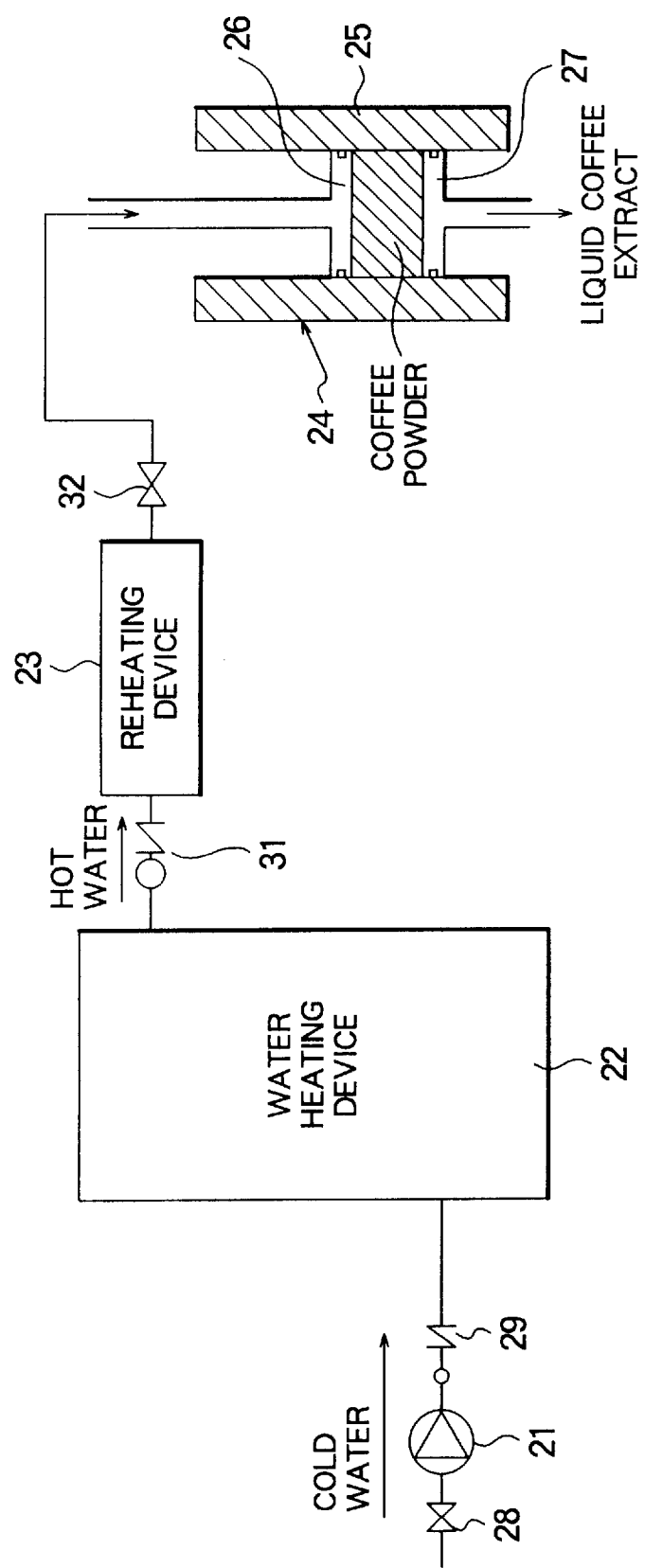
FIG. 2 is a schematic diagram of a conventional espresso extracting apparatus.

Turning to FIG. 2, the description will be directed to the conventional espresso extracting apparatus. The espresso extracting apparatus comprises a water pump 21, a water heating device 22, a reheating device 23 of a small capacity, and an extracting device 24 provided with an extracting cylinder 25 and a first piston 26 and a second piston 27 fitted in the extracting cylinder 25 and connected to the reheating device 23. The first piston 26 has a plurality of axial holes formed therein. The second piston 27 has a plate-like filter built therein.

In the espresso extracting apparatus, cold water flows into the water pump 21 via a valve 28. The water pump 21 feeds the cold water under discharge pressure of about 7 kg/cm$^2$·G to the water heating device 22 via a check valve 29. The water pump 21 ceases to operate after it has fed the cold water in a prescribed total amount.

The cold water of high pressure is heated by the water heating device 22 and turned into hot water of elevated temperature and increased pressure (about 90° C. and 7 kg/cm$^2$·G). The hot water of elevated temperature and increased pressure flows into the reheating device 23 via a check valve 31 and, in consequence of a reheating treatment performed therein, turns into hot water of more elevated temperature and more increased pressure (about 180° C. and 15 kg/cm$^2$·G).

When a valve 32 is opened, the whole hot water of elevated temperature and increased pressure (about 180° C. and 15 kg/cm$^2$·G) held in the reheating device 23 of a small capacity flows via the axial holes in the first piston 26 into the extracting cylinder 25 as decompressed and converted into a mixture of hot water and steam and prewets and steams the coffee powder compressed between the first piston 26 and the second piston 27.

The water pump 21 is actuated to feed cold water under pressure to the water heating device 22. Under the pressure of the incoming cold water, the hot water of elevated temperature and increased pressure (about 90° C. and 7 kg/cm$^2$·G) passes the reheating device, flows into the extracting cylinder 25 via the first piston 26, passes the layer of coffee powder steamed in the extracting cylinder 25, and extracts the coffee essence contained in the coffee powder. The liquid coffee extract is removed from the extracting cylinder 25 via the plate-like filter built in the second piston 27.

Next referring to FIG. 3, the description will be made as regards a coffee extracting apparatus according to an embodiment of this invention. The coffee extracting apparatus is of a percolating type known in the art.

A water heating device 41 is connected via a valve 42 to a water supply which is for conducting cold water. The water heating device 41 is for heating the cold water into hot water and will be referred to as a hot water producing arrangement. A pressure hot water feeding device 43 is connected via a valve 44 to the water heating device 41. The valve 44 will be referred to as a hot water supplying arrangement.

The pressure hot water feeding device 43 is disposed on the downstream side of the water heating device 41. The pressure hot water feeding device 43 is provided with a hot water feeding cylinder 45, a hot water feeding piston 46 fitted into the hot water feeding cylinder 45, and a piston drive unit 47 for driving the hot water feeding piston 46.

One end of the hot water feeding cylinder 45 is diametrically converged to form an upstream area 45a of the outlet. An extracting cylinder cap 45b resembling a flange is formed in the end part of the diametrically converged part. A downstream area 45c of the outlet is diametrically diverged in the shape of a funnel inside the extracting cylinder cap 45b. A water control valve 48 is for opening and closing the upstream area 45a of the outlet and is disposed in the hot water feeding cylinder 45. A flow distributor 49 resembling a shower nozzle is disposed inside the downstream area 45c of the outlet which is diametrically diverged in the shape of a funnel.

An extracting cylinder 51 is disposed contiguously to the extracting cylinder cap 45b in such a manner that one end thereof may be opposed to the extracting cylinder cap 45b. The extracting cylinder 51 is referred to as an extracting container.

A support member 52 is provided with a large-diameter tubular part 52a equal in diameter to the extracting cylinder 51 and a small-diameter tubular part 52b. The support member 52 is disposed contiguously to the extracting cylinder 51 in such a manner that the large-diameter tubular part 52a may be opposed to the other end of the extracting cylinder 51.

A plate-like filter 53 is fitted in the large-diameter tubular part 52a of the support member 52 and supported in place by the support member 52. The large-diameter tubular part 52a of the support member 52 contacts the other end of the extracting cylinder 51 across a paper filter 54. The paper filter 54 is supported jointly by the plate-like filter 53 and the large-diameter tubular part 52a of the support member 52. Therefore, a combination of the plate-like filter 53 and the paper filter 54 covers an outlet opening of the extracting cylinder 51 and will be referred to as a filter member.

A control device adapted to control the operations of the valves 42 and 44, the water heating device 41, the drive unit 47, the control valve 48, etc. and not shown in the diagram is disposed.

Figure 3:
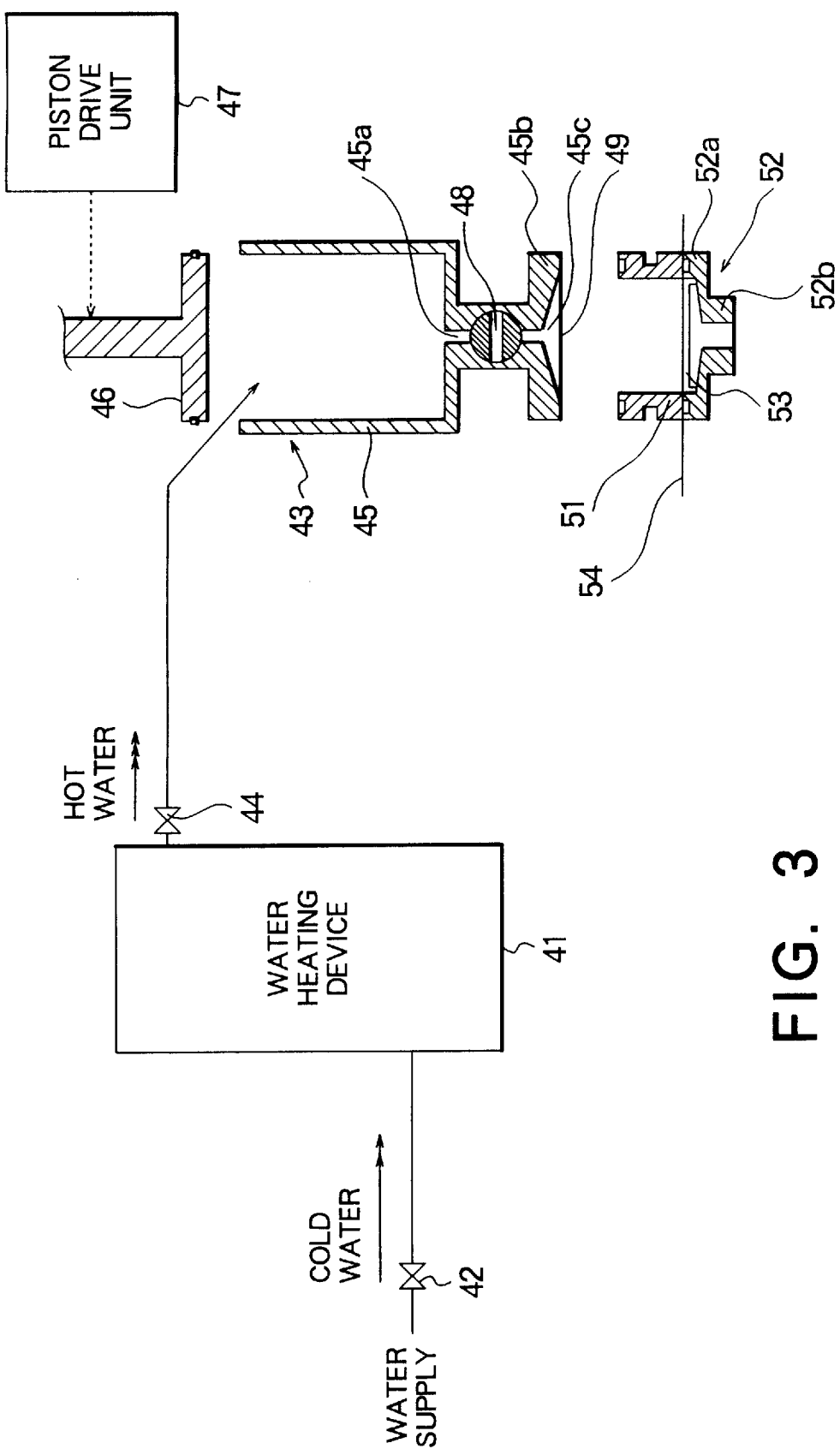
FIG. 3 is a schematic diagram of a coffee extracting apparatus according to an embodiment of this invention.

Referring to FIGS. 4A through 4F together with FIG. 3, the description is directed to operation of the coffee extracting apparatus.

While the coffee extracting apparatus is in the initial state thereof, the hot water feeding piston 46 assumes a retracted position separated from the hot water feeding cylinder 45 and the control valve 48 is closed as illustrated in FIG. 3. The large-diameter tubular part 52a of the filter support 52 contacts the other end of the extracting cylinder 51 across the paper filter 54. The extracting cylinder 51 keeps a distance from the extracting cylinder cap 45b.

Cold water of substantially normal pressure is supplied from the water supply via the valve 42 to the water heating device 41 as indicated by a double arrow in FIG. 3. The water heating device 41 heats the cold water of substantially normal pressure to form hot water of substantially normal pressure and elevated temperature of about 95° C.

As the valve 44 is kept open for a prescribed duration, the hot water of substantially normal pressure formed in the water heating device 41 flows in a prescribed volume into the hot water feeding cylinder 45 on the downstream side as indicated by a triple arrow in FIG. 3.

Hot water collects in a prescribed amount in the hot water feeding cylinder 45 as illustrated in FIG. 4A. A coffee powder 200 is fed into the extracting cylinder 51 from a supply device (not shown) in the manner known in the art.

As the drive unit 47 is actuated, the hot water feeding piston 46 advances into the hot water feeding cylinder 45 as illustrated in FIG. 4B, compresses the air in the hot water feeding cylinder 45, and presses the hot water 100 in the hot water feeding cylinder 45 to a level in the range of 1–3 kg/cm$^2$·G. As the extracting cylinder 51 and the support member 52 are integrated and are actuated by another drive unit not shown in the diagram, one end of the extracting cylinder 51 is pressed against the extracting cylinder cap 45b and connected to the downstream area 45c of the outlet of the hot water feeding cylinder 45. The contacting parts of the hot water feeding piston 46 and the hot water feeding cylinder 45, the pressed parts of the large-diameter tubular part 52a of the filter support 52 and the other end of the extracting cylinder 51, and the pressed parts of the one end of the extracting cylinder 51 and the extracting cylinder cap 45b are sealed with an O ring.

As illustrated in FIG. 4C, the control valve 48 is briefly opened during a first time duration. A particular or small amount of the hot water 100 pressed to a level in the range of 1–3 kg/cm$^2$·G is forced out of the hot water feeding cylinder 45 by the hot water feeding piston 46, passed through the upstream area 45a of the outlet until the funnel-shaped downstream area 45c of the outlet, spread over the entire surface of the flow distributor 49, passed through the flow distributor 49, fed in the form of a multiplicity of linear columns of flow like those of a shower to the extracting cylinder 51, and enabled to prewet the coffee powder 200 in the extracting cylinder 51.

As illustrated in FIG. 4D, the control valve 48 is briefly closed during a second time duration to restart the feed of the hot water to the extracting cylinder 51. In this connection, the prewetted coffee powder 200 is steamed. A minute amount of the liquid extract obtained during the step of prewetting and the step of steaming is passed through the paper filter 54, the plate-like filter 53, and the support member 52 and dropped into a coffee cup 300.

As illustrated in FIG. 4E, the control valve 48 is opened during a third time duration longer than the first time duration. The whole remaining hot water 100 pressed to a level in the range of 1–3 kg/cm$^2$·G is forced out of the hot water feeding cylinder 45 by the hot water feeding piston 46, passed through the upstream area 45a of the outlet until the downstream area 45c of the funnel-shaped outlet, passed through the flow distributor 49 resembling a shower nozzle as spread over the entire surface of the flow distributor 49, and fed as a specific amount of the hot water in the form of a multiplicity of linear columns of flow like those of a shower to the extracting cylinder 51. The hot water 100 pressed to a level in the range of 1–3 kg/cm$^2$·G passes the layer of the prewetted and steamed coffee powder 200 and extracts the coffee essence contained in the coffee powder. The liquid coffee extract passes the paper filter 54 and the plate-like filter 53 and flows through the filter support 52 and trickles down the coffee extracting apparatus into the coffee cup 300.

Thus, the coffee extracting apparatus carries out an extracting process. During the extracting process, it is to be noted that the control valve 48 is driven to intermittently adjust the feed of the hot water to the extracting cylinder 51.

The air of pressure increased to a level in the range of 1–3 kg/cm$^2$·G remaining in the hot water feeding cylinder 45 after the forced departure of the hot water 100 is forced out of the hot water feeding cylinder 45 by the hot water feeding piston 46 as illustrated in FIG. 4F and, at the same time, the paper filter 54 and the support member 52 enveloping the plate-like filter 53 are separated from the extracting cylinder 51 by the action of the other drive unit not shown in the diagram. The coffee grounds 200' in the extracting cylinder 51 are forced out of the extracting cylinder 51 and dropped onto the paper filter 54 by the air pressed to a level in the range of 1–3 kg/cm$^2$·G. By a drive device not shown in the diagram, the used paper filter 54 carrying the coffee grounds 200' thereon is set moving laterally and discarded. At the same time, a newly supplied paper filter 54 is moved and set in place on the support member 52 by the drive device not shown in the diagram.

As the extracting cylinder 51 is actuated by the drive device not shown in the diagram, it separates from the extracting cylinder cap 45b and collides against the support member 52 which carries the unused paper filter 54 thereon.

As is clearly noted from the description given above, in the coffee extracting apparatus, the pressure in the extracting cylinder 51 abruptly increases because the hot water which has been pressed by the pressure hot water feeding device 43 is fed to the extracting cylinder 51. The coffee extracting apparatus, therefore, permits fast extraction of the coffee essence as compared with the hot water feeding cylinder type extracting apparatus. The water heating device 41 which is provided for the coffee extracting apparatus according to this invention and adapted to form hot water of substantially normal pressure, unlike the water heating device provided for the espresso extracting apparatus and adapted to form hot water of high pressure, does not need to be in a structure proof against pressure. Further, the coffee extracting apparatus according to the present invention is not possessed of a pump or a check valve. The coffee extracting apparatus according to this invention, therefore, is inexpensive as compared with the espresso extracting apparatus.

The pressure hot water feeding device 43 adapted to retain an inner pressure in the range of 1 to 3 kg/cm$^2$·G, unlike the reheating device provided for the espresso extracting apparatus and adapted to retain an inner pressure of about 15 kg/cm$^2$·G, does not need to be in a strong structure proof against pressure. As a result, the coffee extracting apparatus is further inexpensive as compared with the espresso extracting apparatus.

The pressure hot water feeding device 43 presses the hot water by some means other than the application of heat, specifically by the motion of the hot water feeding piston 46. When the hot water is pressed by the application of heat, it is not easy to press the hot water to a necessary level because the temperature of the heating vessel must be kept under watch while this heating is in process. When the hot water is pressed by some means other than the application of heat, it is easy to press the hot water to a necessary level.

The pressure hot water feeding device 43 comprises the hot water feeding cylinder 45, the hot water feeding piston 46 fitted into the hot water feeding cylinder 45, and the drive unit 47. These components parts are easily procured in the market.

In the coffee extracting apparatus according to the present invention, since the flow distributor 49 resembling a shower nozzle is interposed between the outlet 45b of the hot water feeding cylinder 45 and one end of the extracting cylinder 51, the hot which is forced out of the hot water feeding cylinder 45 is passed through the flow distributor 49 as spread over the entire surface of the flow distributor 49 resembling a shower nozzle and fed in the form of a multiplicity of linear columns of flow like those of a shower to the extracting cylinder 51. As a result, the hot water is fed evenly to the coffee powder 200 held in the extracting cylinder 51. As a result, the liquid coffee extract is obtained in a high concentration.

In the coffee extracting apparatus according to the present embodiment, the plate-like filter 53 is prevented from being clogged because the paper filter 54 is interposed between the extracting cylinder 51 and the plate-like filter 53. The paper filter 54 cannot be clogged because it is a disposable item and is replaced with a new supply after each round of coffee extraction.

The coffee extracting apparatus according to the present invention is enabled to effect the extraction of the coffee essence by prewetting and steaming the coffee powder 200 and passing the hot water through the layer of the steamed coffee powder 200 because it is provided with the control device which briefly opens and closes the control valve 48 to feed a small amount of the pressed hot water to the extracting cylinder 51 and then opens the control valve 48 to feed the pressed hot water remaining in the hot water feeding cylinder 45 wholly to the extracting cylinder 51. As a result, it is capable of obtaining the liquid coffee extract in a high concentration as compared with the hot water feeding cylinder type extracting apparatus.

While the present invention has thus far been described in connection with a single embodiment thereof, it will readily be possible for those skilled in the art to put this invention into practice in various other manners.

For example, the hot water in the hot water feeding cylinder 45 may be pressed by blowing into the hot water feeding cylinder 45 the compressed air formed with a compressor or stored in a cylinder instead of pressing the hot water in the hot water feeding cylinder 45 by the action of the hot water feeding piston 46.

The action of prewetting and that of steaming may be performed in a plurality of rounds by briefly opening and closing the control valve 48 as many times. One round of prewetting possibly fails to moisten the coffee powder evenly. A plurality of rounds of prewetting infallibly and evenly moisten and steam the coffee powder. As a result, the concentration of the liquid coffee extract is increased.

The control valve 48 may be briefly opened and then the opening degree of the control valve 48 briefly throttled instead of briefly opening and closing the control valve 48. Even by briefly throttling the opening degree of the control valve 48, the prewetted coffee powder can be steamed. In this case, the brief opening of the control valve 48 and the brief throttling of the opening degree may be repeated in a plurality of rounds. The repetition in the plurality of rounds enables the coffee powder to be infallibly and evenly moistened and steamed. As a result, the concentration of the liquid coffee extract is heightened.

Alternatively, the extraction of the coffee essence may be attained by briefly opening and closing the control valve 48 before the hot water in the hot water feeding cylinder 45 is pressed thereby causing a small amount of the hot water to fall under its own weight into the extracting cylinder 51 and prewet and steam the coffee powder therein, then pressing the hot water in the hot water feeding cylinder 45, and subsequently opening the control valve 48 thereby feeding the pressed hot water in the hot water feeding cylinder 45 wholly to the extracting cylinder 51. In this case, the actions of briefly opening and closing the control valve 48 may be repeated in a plurality of rounds.

The extraction of the coffee essence may be otherwise attained by briefly opening and closing the control valve 48 before the hot water in the hot water feeding cylinder 45 is pressed and then briefly throttling the opening degree of the control valve 48, repeating the brief opening of the control valve 48 and the brief throttling of the opening degree thereof in a plurality of rounds thereby effecting the actions of prewetting and steaming in as many rounds, then pressing the hot water in the hot water feeding cylinder 45, and subsequently opening the control valve 48 thereby feeding the pressed hot water in the hot water feeding cylinder 45 wholly to the extracting cylinder 51.

When the hot water yet to be pressed is used for prewetting and steaming the coffee powder as described in the last two paragraphs, the control valve 48 may be opened and part of the hot water in the hot water feeding cylinder 45 may be consequently fed under the weight of its own to the extracting cylinder 51 and consumed therein for effecting the extraction of coffee essence after the actions of prewetting and steaming have been performed and before the hot water in the hot water feeding cylinder 45 is pressed, then the control valve 48 may be closed and the hot water in the hot water feeding cylinder 45 may be consequently pressed, and subsequently the control valve 48 may be opened and the pressed hot water in the hot water feeding cylinder 45 may be consequently fed wholly to the extracting cylinder 51 and consumed therein to effect the extraction of coffee essence.

If the pressed hot water is fed to the extracting cylinder 51 immediately after the actions of prewetting and steaming have been performed, the possibility of the pressed hot water flowing into the extracting cylinder 51 and fluidizing the coffee powder and inducing it to mingle with the hot water will arise. If the coffee powder is fluidized and mingled with the hot water, the concentration of the liquid coffee extract will be lower than when the hot water passes the layer of the coffee powder. When the hot water yet to be pressed is fed under its own weight to the extracting cylinder 51 immediately after the actions of prewetting and steaming have been performed, the hot water flows at a relatively low speed into the extracting cylinder 51 and passes the layer of the coffee powder without fluidizing the coffee powder. As a result, the coffee powder and the hot water intimately contact each other. Though the pressed hot water flows at a high speed into the extracting cylinder 51, it does not fluidize the coffee powder because the coffee powder has already contacted the hot water intimately. As a result, the decrease of the concentration of the liquid coffee extract is precluded.

What is claimed is:

1. A coffee extracting apparatus comprising an extracting container having an outlet opening for extracting coffee essence from coffee powder after being supplied with hot water and a support member for supporting a filter member to cover said outlet opening of the extracting container, said coffee extracting apparatus further comprising:

a water feeding device connected to said extracting container for feeding said hot water to said extracting container, said water feeding device including a reservoir for holding water at an elevated temperature and a pressure elevating device for elevating the pressure of the water held in the reservoir;

a water control valve connected to said water feeding device at a location between an outlet from said reservoir and an inlet to said extracting container for controlling a feed of said hot water from said water feeding device to said extracting container.

2. A coffee extracting apparatus as claimed in claim 1, further comprising:

hot water producing means for producing said hot water; and hot water supplying means connected to said hot water producing means and said water feeding device for supplying said hot water from said hot water producing means to said water feeding device.

3. A coffee extracting apparatus as claimed in claim 1, wherein said pressure elevating device elevates the pressure of the hot water to the range of 1 to 3 $kg/cm^2 \cdot G$.

4. A coffee extracting apparatus as claimed in claim 1, wherein said water feeding device comprises:

a cylinder forming said reservoir and a piston and drive unit forming said pressure elevating device;

said piston closely fitted into said cylinder and movable along a central axis of said cylinder; and said drive unit connected to said piston for driving said piston to elevate the pressure of the water held in said cylinder.

5. A coffee extracting apparatus as claimed in claim 1, further comprising a flow distributor interposed between said water feeding device and said extracting container for distributing said hot water into a shower form.

6. A coffee extracting apparatus as claimed in claim 1, wherein said filter member comprises:

a plate-like filter supported to said support member; and a paper filter between said extracting container and said support member and supported to said support member.

7. A method of extracting coffee essence in a coffee extracting apparatus having water feeding device, an extracting container, and a water control valve for controlling the flow of hot water from the water feeding device to the extracting container, comprising the steps of:

opening the water control valve during a first time duration to feed a particular amount of the hot water to the extracting container, said particular amount causing coffee powder in the extracting container to be prewetted;

making the water control valve restrict the feed of the hot water to the extracting container during a second time duration; and opening the water control valve after the making step during a third time duration longer than said first time duration to feed a specific amount of the hot water to the extracting container, said specific amount causing coffee essence to be effectively extracted from the coffee powder.

8. A method as claimed in claim 7, wherein said making step makes the water control valve stop the feed of the hot water to the extracting container during said second time duration.

9. A method as claimed in claim 7, wherein said making step makes the water control valve reduce the feed of the hot water to the extracting container during said second time duration.

10. A method as claimed in claim 7, further comprising the step of alternately repeating the first-mentioned opening step and said making step.

11. A method as claimed in claim 7, further comprising the step of elevating the pressure of the hot water held in the water feeding device.

12. A method as claimed in claim 11, wherein the elevating pressure step is carried out before the first-mentioned opening step.

13. A method as claimed in claim 11, wherein the elevating pressure step is carried out between the making step and the last-mentioned opening step.

14. A method as claimed in claim 11, wherein the last-mentioned opening step is divided into a first and a second opening step, and the elevating pressure step is carried out between the first and the second opening steps.

15. A coffee extracting apparatus comprising an extracting container having an outlet opening for extracting coffee essence from coffee powder after being supplied with hot water and a support member for supporting a filter member to cover said outlet opening of the extracting container, said coffee extracting apparatus further comprising:

a water feeding device connected to said extracting container for feeding said hot water to said extracting container, said water feeding device comprising:
a cylinder connected to said extracting container for receiving hot water therein;
a piston closely fitted into said cylinder and movable along a central axis of said cylinder; and
a drive unit connected to said piston for driving said piston to elevate the pressure of the hot water held in said cylinder; and a water control valve connected to said water feeding device at a location between an outlet from said cylinder and an inlet to said extracting container for controlling a feed of said hot water from said water feeding device to said extracting container.

* * * * *